Patented July 18, 1950

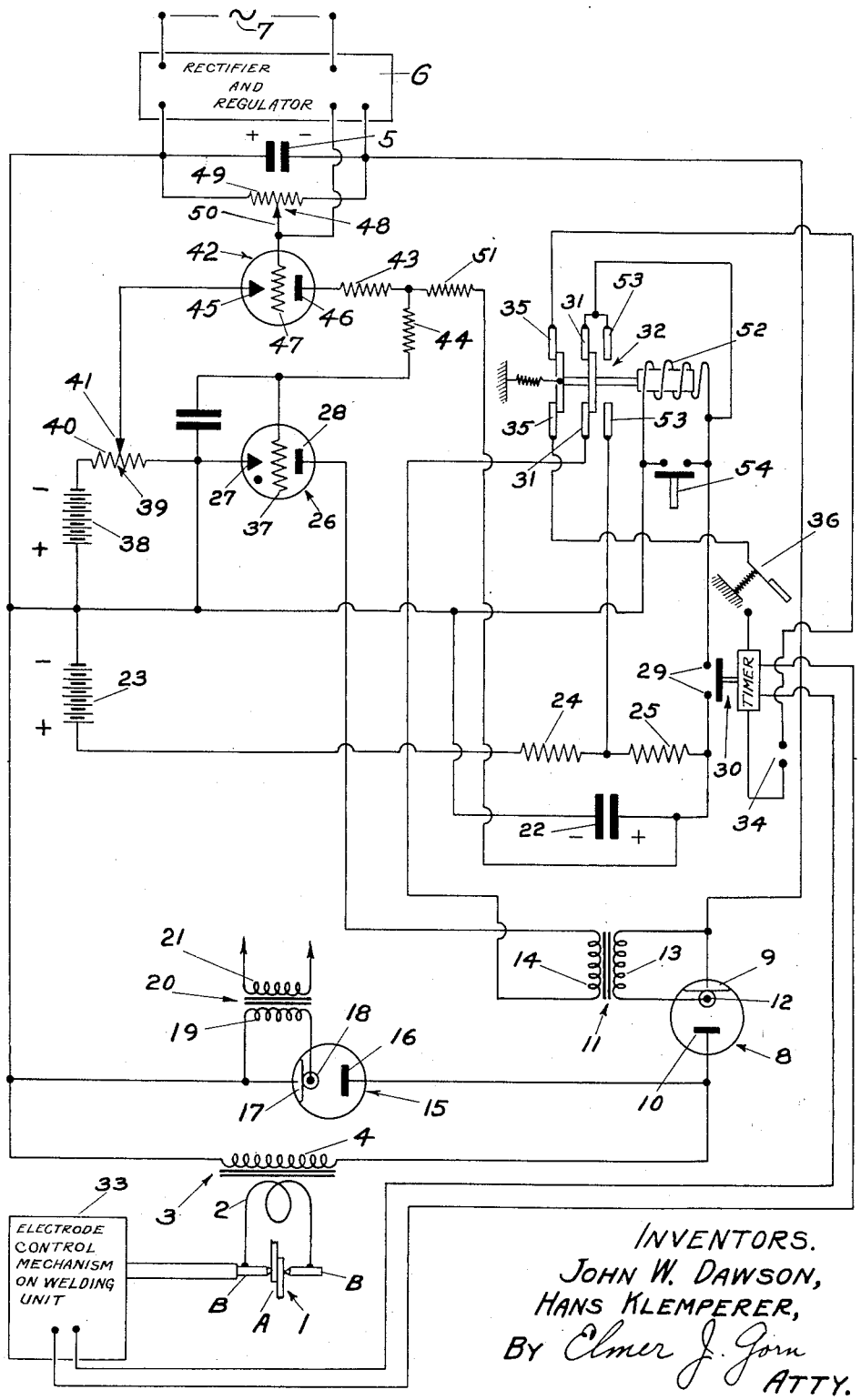

2,515,636

UNITED STATES PATENT OFFICE 2,515,636

CONDENSER WELDING SYSTEM

John W. Dawson, West Newton, and Hans Klemperer, Belmont, Mass., assignors to Raytheon Manufacturing Company, Newton, Mass., a corporation of Delaware Application June 27, 1942, Serial No. 448,738

5 Claims. (Cl. 219—4)

This invention relates to condenser welding systems, and more particularly to such systems in which electrical energy is stored in a condenser and then discharged through a welding transformer to thereby supply welding energy to a welding load.

In welding systems of this type the type of welds produced are determined by the amount of energy supplied to the welding load. Welding loads are critical in regard to the amount of energy supplied thereto and if too much or too little energy is supplied a poor quality of welds is produced. Therefore, with any type of welding load where it is desirable that the welds be uniform, a constant amount of energy must be supplied for each weld. In welding systems of this type the amount of energy delivered to the welding load is dependent upon the amount of energy stored in the condenser. In the copending application of John W. Dawson, Serial No. 440,819, filed April 28, 1942, for Condenser Charging Systems, there is described a system for preventing overcharging of the condenser and therefore for preventing the delivery of too much energy to the welding load. In this application there will be described a system for preventing the making of welds when the condenser of such system is undercharged. Such undercharging is most likely to occur when attempts are made to operate the equipment too rapidly. Undercharging may also be due to some defect in the charging equipment, or in the charging regulator.

An object of this invention is the provision of a condenser welding system in which the discharge of the condenser into the welding load is prevented whenever said condenser is undercharged. a feature of this system is that not even a single weld can be produced when the condenser is undercharged.

Another object of this invention is the provision of a protective means in a condenser welding system, which means is adapted to lock the system against further operation whenever an attempt is made to weld with an undercharged condenser. For example, the welding electrodes may be locked onto the work so as to prevent moving of the work, or the electrodes may be otherwise immobilized, after an attempt has been made to weld with an undercharged condenser. In such case it becomes necessary for the operator to go to the power supply system and press a release button before the electrodes will again be free. Thus, since the operator is compelled to go to the power system after an attempt is made to weld while the condenser is undercharged, he is thereby warned of the possibility of a defect in the operation of the charging or the charging regulator means, or of a defect in the system itself which may need adjustment or other correction.

Other and further objects and advantages of this invention will become apparent and the foregoing will be best understood from the following description of an embodiment thereof, reference being had to the drawing in which the figure is a schematic diagram of a condenser welding system embodying our invention.

Referring now to the drawing, welding current is to be supplied to a welding load 1 from the secondary winding 2 of a welding transformer 3 having a primary winding 4. The primary winding 4 is adapted to be energized by the discharge of a relatively large condenser 5. Condenser 5 is charged from any suitable source of direct current such as a direct current generator, battery, rectifier, or the like. In the embodiment illustrated, the source of direct current is a rectifier 6 connected to a source of alternating current 7. The rectifier 6 preferably consists of a rectifier employing grid controlled rectifying tubes and a regulator adapted to control the charging current by applying a cut-off bias to the grids of the rectifying tubes. Such a combined rectifier and regulating system is described in detail in the copending application of John W. Dawson, Serial No. 440,819, filed April 28, 1942, for Condenser Charging Systems. The rectifier used in such system is capable of being adjusted to select the voltage to which the condenser of said system is charged.

As stated before, condenser 5 is adapted to be discharged into the primary winding 4 of the welding transformer 3. For this purpose the positive side of condenser 5 is connected to one end of primary winding 4, and the negative side of condenser 5 is connected through a controlled ignition discharge tube 8 to the other side of the primary winding 4.

Tube 8 is preferably of the pool cathode type with an igniting electrode for initiating a cathode spot on the pool in order to enable said tube to conduct current. The igniting electrode is preferably of the electrostatic type, consisting of a conductor separated and insulated from the cathode by a thin glass layer. Tube 8 has its cathode 9 connected to the negative side of condenser 5, and its anode 10 connected to one end of the primary winding 4 of the welding transformer 3, the other end of said winding being connected to the positive side of condenser 5. In order to initiate conduction of tube 8 an igniting transformer 11 is provided which is adapted to supply igniting impulses to the igniting electrode 12 of said tube. Igniting transformer 11 has its secondary 13 connected between the igniting electrode 12 and the cathode 9 of tube 8, and has a primary winding 14 which is adapted to be supplied with pulses of current for igniting tube 8.

In order to establish a shunt path for the decay of current in primary winding 4 of welding transformer 3, as described and claimed in the copending application of John W. Dawson, Serial No. 309,124, filed December 14, 1939, for Condeser Welding System, now Patent No. 2,508,103, dated May 16, 1950, a tube 15, preferably of the same type as tube 8, is connected across the primary winding 4. Tube 15 has its anode 16 connected to the end of the primary winding 4 which is connected to the anode 10 of the tube 8. The cathode 17 of tube 15 is connected to the other end of said primary winding. The igniting electrode 18 of tube 15 is supplied with impulses of igniting current from the secondary 19 of the igniting transformer 20 which is adapted to have its primary 21 supplied with pulses of current as will be hereinafter explained.

For supplying pulses of current to the primary 14 of igniting transformer 11, we prefer to utilize the discharge from a condenser 22. Condenser 22 may be charged from any suitable source of direct current, such as for example, a battery 23. The negative side of battery 23 is connected to the negative side of condenser 22, and the positive side of battery 23 is connected to the positive side of said condenser through a pair of series resistances 24 and 25. The discharge of condenser 22 into the primary winding 14 of the igniting transformer 11 is adapted to be controlled by a controlled gaseous rectifying tube 26. Tube 26 is preferably of the type having a continuously energized cathode. Tube 26 has its cathode 27 connected to the negative side of condenser 22 and its anode 28 connected to one end of the primary winding 14 of igniting transformer 11. The other end of the primary winding 14 is connected to the positive side of condenser 22 through a pair of contacts 29 adapted to be connected by a timer 30, and through another pair of contacts 31 of a relay 32. The relay 32 is adapted to connect contacts 31 when said relay is not energized. The timer 30 is adapted to connect the contacts 29 when said timer is energized. Moreover, when said timer is energized the electrode control mechanism 33 on the welding unit, which is connected to said timer, is also adapted to be energized so as to bring the welding electrodes into position for welding, that is the welding electrodes B are brought into contact with the work A which is to be welded. In order to energize timer 30, a pair of terminals 34, which are adapted to be connected to a suitable source of current, are provided. One of the terminals 34 is connected directly to the timer 30. The other of said terminals 34 is connected through a pair of contacts 35 in relay 32 and through a foot switch 36 back to the timer. When relay 32 is not energized said relay is adapted to connect contacts 35. When the operator of this system desires to produce a weld, he steps on the foot switch 36 thereby connecting the timer 30 to its source of energizing current which is connected to terminals 34. The electrode control mechanism 33 thereupon brings the electrodes A into contact with the work B, and thereafter the timer connects contacts 29, to thereby discharge condenser 22 into the primary winding 14 of igniting transformer 11. Tube 8 is thereby fired and condenser 5 discharges through said tube into the primary 4 of the welding transformer 3.

As condenser 5 discharges through the primary winding 4 of welding transformer 3, the potential across said winding decreases as the current in said winding rises and then the potential reverses while the current continues to flow through said primary winding 4 in the original direction. Shunt tube 15 is adapted to be fired upon such reversal of potential, and at this time igniting impulses are supplied to the primary 21 of igniting transformer 20. One system for firing shunt tube 15 at the proper time is described in the hereinabove-mentioned copending application of John W. Dawson, Serial No. 309,124, and since such systems for firing shunt tubes are now well known in the art, they will not be here described.

However, if condenser 5 is undercharged, means are provided for preventing the discharge of said condenser into the welding transformer. In order for condenser 5 to discharge into the welding transformer it is necessary that tube 8 be fired, and for this purpose it is necessary that igniting current be supplied to the primary winding 14 of the igniting transformer 11. Furthermore, in order that current may be supplied to the primary winding 14 of the igniting transformer 11 it is necessary that tube 26 should conduct. It will therefore be seen that if tube 26 is prevented from conducting whenever condenser 5 is undercharged, then condenser 5 will be prevented from discharging into the welding transformer and consequently no weld will be produced.

To prevent tube 26 from conducting when condenser 5 is undercharged, a cut-off bias is preferably impressed on the control grid 37 of tube 26. The potential for this cut-off bias may be derived from any suitable source, such as for example, a battery 38 which is connected in series with the battery 23 hereinbefore mentioned. To impress this bias between cathode 27 and grid 37, battery 38 has its positive side connected to the cathode 27 of tube 26, and a potentiometer 39, having its resistance 40 connected across battery 38, has its adjusting arm 41 connected in series with a vacuum tube 42 and resistors 43 and 44 to the grid 37 of tube 26. Tube 42 is preferably provided with a continuously energized cathode 45 which is connected to the arm 41 of potentiometer 39, and an anode 46 which is connected to one end of resistance 43. Tube 42 is also provided with a control grid 47 which is adapted to control conduction in said tube.

It will be seen that when tube 42 conducts, the potential derived from battery 38 will be impressed between the grid 37 and the cathode 27 of tube 26, and will thereby prevent tube 26 from conducting. Therefore, as long as tube 42 is conducting, tube 26 cannot conduct, and therefore cannot supply igniting impulses to fire tube 8 and discharge condenser 5 into the welding transformer. Anode potential for tube 42 is provided by connecting the positive side of a suitable source of direct current, such as a battery 23, through series resistors 24 and 25 and through another series resistor 51 and the aforementioned resistor 43 to the anode 46 of tube 42.

Conduction of tube 42 is controlled by the potential impressed between its grid 47 and cathode 45. Since the conduction of tube 42, as has been explained hereinabove, ultimately prevents the discharge of condenser 5 into the welding transformer, tube 42 is adapted to conduct whenever condenser 5 is undercharged and conduction of said tube is adapted to be halted whenever condenser 5 reaches its proper charge. For this purpose it is preferred to provide a potentiometer 48 having its resistance 49 connected across condenser 5 and its arm 50 conected to the grid 47 of tube 42. The positive side of battery 38 is connected to the positive side of condenser 5. It will therefore be apparent that battery 38 is connected between cathode 45 and grid 47 of tube 42 with the positive side of said battery towards said grid. Thus, battery 38 will impress a positive voltage upon the grid 47 and will therefore tend to make said tube 42 conduct. It will be seen, however, that as condenser 5 is being charged, the potential of said condenser is impressed across the resistance 49 of potentiometer 48 and that this potential will be impressed on the grid 47 and the cathode 45 of tube 42 in a direction to oppose the potential of battery 38. Battery 38 therefore acts as a target source and will cause tube 42 to conduct until such time as condenser 5 reaches a preselected potential, at which time the potential derived from condenser 5 through potentiometer 48 will overcome the potential of battery 38 and cause tube 42 to cease conducting. By adjusting arm 50 of potentiometer 48 the potential on condenser 5 which will cut off conduction in tube 42 may be selected.

Potentiometer arm 50 is also connected to the rectifier and regulating means 6 and adjustment of said arm is also adapted to select the potential to which condenser 5 is charged by said rectifier and regulating means 6. The precise manner in which the rectifier and regulating means 6 is affected by the adjustment of potentiometer arm 50 will be readily understood by those versed in the art, and one such specific system is illustrated in the copending application of John W. Dawson hereinabove mentioned.

From the foregoing it will be seen that by the adjustment of a single control, arm 50, the potential to which condenser 5 is adapted to be charged and the potential at which said condenser may be discharged are simultaneously and correspondingly varied. It is preferred that the potential at which the under-voltage protective system hereinabove described ceases to function to prevent discharge of condenser 5 should be slightly lower than the potential to which the rectifier and regulator 6 is set. The margin between these two potentials may be varied by adjusting potentiometer arm 41. Adjustment of potentiometer arm 41 serves to vary the potential below which the undervoltage protective means operates while it does not affect the rectifier and regulator 6. Usually it is desirable to first adjust potentiometer arm 41 to fix the margin between the two potentials hereinbefore mentioned. Once this adjustment has been made it preferably remains fixed, and when this welding system is in operation the operator adjusts the system for various welding loads by adjusting only potentiometer arm 50. In one specific embodiment of this invention the margin fixed between the potential selected for the rectifier and regulator 6, and the potential selected for the undervoltage protective means, was from about 2 to 4 per cent of said potential selected for the rectifier and regulator 6.

As explained above when foot switch 36 is closed the timer 30 is energized thereupon first causing the electrode control mechanism 33 to bring the welding electrodes together on the work and thereafter connecting contacts 29. If, however, condenser 5 is undercharged when contacts 29 are connected no weld will be produced. Under such circumstances the system here described is not only adapted to operate so as to prevent the production of any weld, but is also adapted to be locked against further welding operations, the welding operator being thereupon compelled to go to the welding power unit and press a release button before the system is unlocked.

As has been explained before when the timer 30 is energized the electrode control mechanism is first actuated thereby bringing the electrodes down on the work to be welded and thereafter the contacts 29 are connected by the timer. Under normal conditions when condenser 5 is properly charged the connection of contacts 29 causes the discharge of said condenser into the igniting transformer and the production of a weld. The timer then continues to operate causing the electrode control mechanism to separate the welding electrodes B and thereby permit removal or advancement of the work between the two welding electrodes. However, when condenser 5 is undercharged and contacts 29 are connected by the timer the system is designed to operate so as to deenergize said timer leaving the welding electrodes locked onto the work, and thereby preventing removal or advancement of the work between the electrodes. As explained before, the timer 30 is energized by current received from a source connected to terminals 34. In supplying current to said timer one of said terminals 34 is connected in series with contacts 35 of the relay 32 and foot switch 36. If contacts 35 are not connected to each other no energy will be supplied to the timer 30 regardless of whether the foot switch 36 is depressed or not. Relay 32 connects contacts 35 whenever said relay is not energized, but when the operating coil 52 of said relay is energized contacts 35 are disconnected. It will therefore be seen that if energizing current is supplied to the operating coil 52 of relay 32 the timer 30 will be deenergized. Current for this purpose may be derived from condenser 22 by connecting operating coil 52 across said condenser in series with contacts 29. It will be seen that when contacts 29 are connected the condenser 22 can discharge both through operating coil 52 and through the circuit consisting of the primary winding 14 of igniting transformer 11 and tube 26. If condenser 5 is properly charged so that no cut-off bias is applied to the grid 37 of tube 26, the constants of the system are so arranged that tube 26 will fire, and the major portion of the discharge of condenser 22 will pass through the circuit including said tube, while only a small amount of current will pass through coil 52, the current passing through coil 52 being insufficient to operate the relay. If, however, condenser 5 is undercharged and cut-off bias is applied to the grid 37 of tube 26, then condenser 22 cannot discharge through the circuit including tube 26. It will therefore discharge through coil 52 of relay 32 thereby actuating said relay and disconnecting contacts 35. When contacts 35 are disconnected the timer is deenergized and the welding electrodes remain locked on the work. The operation of the relay 32 will cause contacts 31 to be disconnected and thereby prevent any possible discharge of current through the primary of the igniting transformer 11.

Since however, condenser 22 discharges in a very short time and therefore is unable to continue to supply current for energizing coil 52 to maintain the system in locked position, another source of current is provided to continue to actuate coil 52. This current is supplied by battery 23 which has its negative side connected directly to one end of coil 52. The other end of coil 52 is connected to the positive side of battery 23 through a pair of contacts 53 of the relay 32 and through resistor 24. Contacts 53 are disconnected when coil 52 is deenergized. When, however, coil 52 is energized said contacts are connected together. Battery 23 thereupon supplies current to coil 52 thus maintaining the timer in deenergized condition and consequently locking the system. In order to unlock the system a push switch 54 is connected across coil 52. When said switch is operated coil 52 is short circuited, thereby deenergizing said coil and thus causing contacts 53 to be disconnected, and contacts 31 and 35 to be connected. When contacts 35 are connected and foot switch is depressed the timer 30 will again be energized and the system again set in operation.

From the foregoing description it will be apparent that a system has been provided in which no welds whatsoever will occur when the condenser operating the welding energy is undercharged. Furthermore, it will be seen that the system described will be locked whenever an attempt is made to weld while the condenser is undercharged.

While we have described in detail one specific embodiment of our invention many variations will readily occur to those versed in this art from the preceding description. Obviously this system is adaptable for operation with a plurality of condensers which supply welding energy and equally obviously different types of relays and tubes or arrangements of such tubes may be utilized. Other variations within the teachings of this invention will be apparent from the foregoing. It is accordingly desired that the appended claims be given a broad interpretation commensurate with the scope of this invention within the art.

What is claimed is:

1. In a condenser welding system, a welding load including at least one movable electrode and the work to be welded, means for advancing and retracting said electrode relative to the work, a condenser, a circuit for discharging said condenser into said load, and means responsive to the voltage on said condenser for preventing operation of said electrode-moving means to retract said electrode and for preventing establishment of said circuit when said condenser is charged under a predetermined level.

2. In a condenser welding system, a welding load including at least one movable electrode and the work to be welded, means for advancing and retracting said electrode relative to the work, a condenser, means for establishing a circuit for discharging said condenser into said load, control means for first initiating the operation of said electrode-moving means to advance said electrode toward the work, and for then initiating the operation of said circuit establishing means to thereby supply welding current to said load and means responsive to the operation of said control means and to the voltage on said condenser and adapted upon operation of said control means to prevent establishment of said circuit and to deenergize said electrode-moving means when said control means operates to initiate the operation of said circuit-establishing means and said condenser is charged under a preselected level.

3. In an electrical system a condenser, means for charging said condenser, a circuit for discharging said condenser, means responsive to the potential on said condenser for preventing establishment of said circuit when the charge on said condenser is below a selected level, means for simultaneously and correspondingly adjusting both of the aforesaid means for selecting the potential at which they are adapted to operate and means for adjusting both of said aforesaid means relative to each other.

4. In an electrical system, a condenser, means for charging said condenser to a predetermined voltage, a load circuit, discharging means for discharging said condenser into said load circuit, said discharging means comprising a space discharge tube which conducts current in response to an igniting impulse supplied thereto, a second condenser adapted to be charged, two alternative circuits connected to said second condenser, the first of said alternative circuits including a second discharging means for discharging said second condenser to supply said igniting impulse, circuit-closing means common to both of said alternative circuits, blocking means responsive to the voltage of said condenser for preventing the operation of said second discharging means when the voltage of said condenser is below said predetermined voltage, said second alternative circuit operating in response to a failure of said first alternative circuit to operate upon closure of said circuit-closing means, whereby said second condenser discharges and operates said lock-out means.

5. In a condenser welding system, a welding load including at least one movable electrode and the work to be welded, means for advancing and retracting said electrode relative to the work, a condenser, a circuit for discharging said condenser into said load, means responsive to the voltage on said condenser for preventing operation of said electrode-moving means to retract said electrode and for preventing establishment of said circuit when said condenser is charged under a predetermined level, and means responsive to the operation of said last-named means for locking said system against subsequent establishment of said circuit.

JOHN W. DAWSON.
HANS KLEMPERER.

REFERENCES CITED

The following references are of record in the file of this patent:

UNITED STATES PATENTS

| Number | Name | Date |
|---|---|---|
| 1,168,346 | Thomson | Jan. 18, 1916 |
| 2,295,293 | Rogers | Sept. 8, 1942 |